United States Patent [19]

Sianesi et al.

[11] Patent Number: 5,258,110
[45] Date of Patent: Nov. 2, 1993

[54] PROCESS FOR PREPARING PEROXIDIC PERFLUOROPOLYETHERS

[75] Inventors: Dario Sianesi, Milan; Antonio Marraccini, Dormelletto; Giuseppe Marchionni, Milan, all of Italy

[73] Assignee: Ausimont s.r.l., Milan, Italy

[21] Appl. No.: 613,495

[22] PCT Filed: Apr. 20, 1990

[86] PCT No.: PCT/EP90/00641
§ 371 Date: Oct. 31, 1990
§ 102(e) Date: Oct. 31, 1990

[87] PCT Pub. No.: WO90/12833
PCT Pub. Date: Nov. 1, 1990

[30] Foreign Application Priority Data

Apr. 20, 1989 [IT] Italy ............................... 20207 A/89

[51] Int. Cl.$^5$ ................................................ C07C 41/00
[52] U.S. Cl. ............................ 204/157.92; 204/157.94
[58] Field of Search ................... 568/560; 204/157.92, 204/157.94, 158.12

[56] References Cited

U.S. PATENT DOCUMENTS

| | | | |
|---|---|---|---|
| 3,639,429 | 1/1972 | Weinmayr | 260/348.5 R |
| 3,715,378 | 2/1973 | Sianesi et al. | 568/560 |
| 3,770,792 | 11/1973 | Sianesi et al. | 204/157.92 |
| 4,460,514 | 7/1984 | Baucom et al. | 562/850 |
| 4,743,300 | 5/1988 | Brinduse et al. | 568/560 |
| 5,149,842 | 9/1992 | Sianesi et al. | 549/550 |

Primary Examiner—John Niebling
Assistant Examiner—C. Delacroix-Muriheid
Attorney, Agent, or Firm—Stevens, Davis, Miller & Mosher

[57] ABSTRACT

A process is disclosed for preparing peroxidic perfluoropolyethers containing perfluoroalkylenoxy units $(CF_2-CF_2O)$ and $(CF_2O)$, which is characterized in that tetrafluoroethylene and oxygen are reacted in a solvent at a temperature not exceeding 50° C. and in the presence of one or more compounds having one or more F—X bonds, in which X is selected from the group consisting of F, O and Cl.

25 Claims, No Drawings

PROCESS FOR PREPARING PEROXIDIC PERFLUOROPOLYETHERS

The present invention relates to a process for the preparation of peroxidic perfluoropolyalkylenoxy compounds, more commonly referred to as peroxidic perfluoropolyethers.

In particular, the present invention relates to a process for preparing peroxidic perfluoropolyethers containing perfluoroalkylenoxy units of formulae ($CF_2$—$CF_2O$) and ($CF_2O$). These compounds are prepared, according to the art, by reacting tetrafluoroethylene with oxygen under irradiation with ultraviolet light.

This technique exhibits the drawback of being delicate and complex, as it requires the use of ultraviolet radiation generators and of reactors of suitable construction in order to permit the radiation to penetrate and to spread inside the reacting phase. Furthermore, since these reactions are usually conducted at very low temperatures, even lower than $-50°$ C., it is necessary to have available efficient means of eliminating the heat associated with the generation of the ultraviolet radiation. Moreover, the reaction yield and the product structure are strongly affected by the amount and distribution of the radiation inside the reaction medium, which considerably limits the desired production flexibility provided by a given reactor.

U.S. Pat. No. 4,460,514 relates to the preparation of non-peroxidic oligomers of ($CF_2O$) having a —$CF_2$—COF end group. These oligomers are useful for the preparation of s-triazines with perfluoroxymethylene substituent groups. In example IIa, perfluoro-3-methyl-butene-1, $CF_2$=$CF$—$CF(CF_3)_2$, is reacted, in the gas phase, with oxygen in the presence of $CF_3OF$ without the use of ultraviolet radiation, which affords, at the end of the reaction, the unreacted olefin, $(CF_3)_2CF$—CFO and a small amount of non-peroxidic oligomers of ($CF_2O$) having a $CF_2$—COF end group.

It has now, surprisingly, been found that the reaction for preparing peroxidic perfluoropolyethers containing perfluoroalkylenoxy units of formulae ($CF_2$—$CF_2O$) and ($CF_2O$) may be effected without use of ultraviolet radiation if $C_2F_4$ is reacted with oxygen in a solvent and in the presence of particular reagents.

It is, thus, an object of the present invention to provide a process which affords peroxidic perfluoropolyethers containing perfluoroalkylenoxy units of formulae ($CF_2$—$CF_2O$) and ($CF_2O$) without using ultraviolet radiation or using UV-irradiation only as a complementary measure.

Another object is to provide a process which is simple, can be carried out in apparatus commonly used in the field of chemical processes and can be controlled simply by regulating the amount of reagents introduced in the course of the reaction.

A further object is to provide a very flexible process which permits to obtain, by varying the operative modalities, a wide range of products with different structural characteristics.

Still another object is to provide a process which results in peroxidic perfluoropolyethers having a very low ratio of —COF end groups to non-functional end groups.

These and still further objects are achieved by the process according to the present invention for preparing peroxidic perfluoropolyethers containing perfluoroalkylenoxy units ($CF_2$—$CF_2O$) and ($CF_2O$).

This process is characterized in that tetrafluoroethylene is reacted with oxygen in a solvent at a temperature not exceeding 50° C. and in the presence of one or more compounds having one or more F—X bonds, in which X is selected from the group consisting of F, O and Cl.

In particular, when X is oxygen, said compound is an oxygen fluoride or an organic compound containing one or more fluoroxy groups. More usually, it is a perhalogenated alkyl or alkylene compound (the halogen atoms of which being F atoms or F and Cl atoms), containing one or more fluoroxy groups and, optionally, one or more heteroatoms, in particular oxygen atoms.

Said compound usually contains one or two fluoroxy groups. Preferably it is a perfluorinated compound; when it is a perhalogenated compound containing F and Cl atoms, the number of Cl atoms present in the molecule generally ranges from 1 to 10. The heteroatoms, if present, preferably are ether oxygen atoms. The number of said heteroatoms in the molecule generally ranges from 1 to 100 and, more usually, from 1 to 10.

When X is F, the compound is $F_2$. When X is Cl, the compound is a chlorine fluoride.

In the following, the compounds having one or more F—X bonds will be referred to as initiators, the use of this term being, however, not binding for the characterization of the reaction mechanism.

It cannot be excluded that a significant amount of reaction initiators may actually be formed in the reaction medium, due to the action exerted by the substances containing one or more F—X bonds on the components of the reaction medium and the products of the reaction, i.e. $O_2$, fluoroolefins, peroxide bonds and carbonyl bonds.

Examples of preferred initiators are:
1) $F_2$;
2) $R^5$—OF, wherein $R^5$ is a $C_{1-10}$—, preferably $C_{1-3}$-perhaloalkyl radical containing only fluorine atoms or containing fluorine atoms and from 1 to 5 chlorine atoms. Preferably, $R^5$ is a perfluoroalkyl radical;

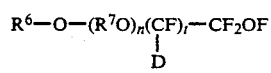   3)

wherein:
D represents F or $CF_3$;
t is zero or 1;
$R^6$ is a $C_{1-3}$-perfluoroalkyl radical or a $C_{1-3}$-perhaloalkyl radical containing fluorine atoms and (one or more, preferably one) chlorine atom(s); preferably $R^6$ is a perfluoroalkyl radical; $R^7$ represents one or more perfluoroalkylene radicals, the same or different from one another, selected from

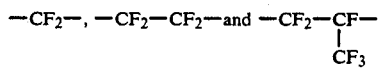

and n ranges from 0 to 50, preferably from 0 to 3; (frequently n ranges from 1 to 10 and, more commonly, from 1 to 3); when different units ($R^7O$) are present, these units are statistically distributed along the chain;

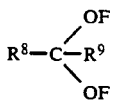

$$R^8 - C \begin{matrix} \nearrow OF \\ \searrow OF \end{matrix} R^9 \qquad 4)$$

wherein $R^8$ is F or a $C_{1-9}$—, preferably $C_{1-3}$-perhaloalkyl radical containing F atoms or F atoms and from one to three Cl atoms; preferably $R^8$ is F or a perfluoroalkyl radical; $R^9$ is F, $R^8$ or a perfluoroalkylmonoether or perfluoroalkylpolyether group $R^6O-(R^7O)_n-CF_2-$, in which $R^6$, $R^7$ and n are as defined above;

5) $FO-(R^7O)_s-F$ wherein $R^7$ is as defined above and s ranges from 1 to 100, preferably 1 to 10, provided that, when $R^7$ represents $-CF_2-$, s has a value higher than 1;

6) $FO-(CF_2)_v-OF$, wherein v ranges from 3 to 5.

Usually, into a liquid phase comprising a solvent, a gaseous tetrafluoroethylene stream, a gaseous oxygen stream and a gaseous or liquid stream of initiator or initiators are fed.

Instead of feeding the initiator or initiators in the form of a gaseous or liquid stream into the liquid phase, it is possible to introduce said initiator(s) into the liquid phase before the commencement of the reaction. This procedure can be employed, for example, when the initiator(s) is (are) liquid at room temperature.

Preferably, also, an inert gas is introduced into the liquid phase. Said inert gas usually is fed in admixture with the initiator(s) if said compound(s) is (are) added to the liquid phase in the form of a gaseous stream. The inert gas can also be employed, in part or as a whole, in combination with the oxygen. In other words, instead of oxygen, it is possible to use mixtures of oxygen and inert gases, in particular air.

The streams of oxygen, gaseous initiator(s) and inert gas can be introduced into the liquid phase in the form of mixtures of two or more components.

The minimum temperature at which the liquid phase is maintained during the reaction is such that the component or components of said phase are in the liquid state. Generally, the reaction temperature ranges from $-120°$ to $+50°$ C., more usually from $-100°$ to $+25°$ and particularly from $-100°$ to $+20°$ C. The most preferred reaction temperatures range from $-100°$ to $0°$ C.

Preferably, the solvent is selected from linear and cyclic fluorocarbons, chlorofluorocarbons, perfluoroamines, perfluorinated ethers and mixtures thereof.

Examples of suitable fluorocarbons or chlorofluorocarbons are $CFCl_3$, $CF_2Cl_2$, cyclo-$C_4F_8$, cyclo-$C_6F_{12}$, chloropentafluoroethane, 1,1,2-trichloro-1,2,2-trifluoroethane, 1,2-dichlorotetrafluoroethane and 1,1,1-trifluorotrichloroethane.

Examples of suitable perfluoroamines are those sold under the designation Fluorinert(®) (produced by 3M).

Examples of suitable perfluorinated ethers are the perfluoropolyethers having perfluoroalkyl end groups and a boiling point lower than 250° C. such as Galden(®), produced by Montefluos.

The inert gas, when employed, preferably is selected from nitrogen, argon, helium, $CF_4$, $C_2F_6$ and mixtures thereof.

Into the liquid phase oxygen is continuously introduced at a partial oxygen pressure in the reactor generally ranging from 0.01 to 10 atmospheres and, more usually, from 0.05 to 1 atmosphere.

The total pressure of the reaction medium generally ranges from about 1 to 10 atmospheres/abs. More usually, the reaction is carried out at about atmospheric pressure.

The concentration of tetrafluoroethylene in the liquid phase generally ranges from 0.01 to 5 moles/liter.

When the initiator or initiators are continuously fed into the liquid phase in the gaseous or liquid state, the flow rate thereof generally ranges from 0.001 to 5 moles per hour per liter or liquid phase and, more usually, from 0.01 to 2 moles per hour per liter of liquid phase.

If the initiator or initiators are introduced into the liquid phase prior to the start of the reaction, the molar ratio $$\frac{\text{initiator(s)}}{\text{tetrafluoroethylene}}$$

generally ranges from 0.01 to 0.1

At the end of the reaction, for example, after 0.1 to 20 hours, the reagent feed is discontinued. The solvent and the unreacted monomer are removed, preferably by distillation, and the peroxidic perfluoropolyether is obtained as residue in the form of an oily liquid.

The reaction can also be conducted in a fully continuous manner, by continuously withdrawing a liquid phase portion from the reactor, subjecting it to distillation, recycling the solvent and the unreacted monomer and recovering the reaction product.

The resulting peroxidic perfluoropolyethers contain perfluoroalkylenoxy units consisting of ($CF_2-CF_2O$) and ($CF_2O$).

The molar concentration of units ($CF_2-CF_2O$) generally ranges from 5 to 95% and, more commonly, from 20 to 90%.

The process of the present invention usually affords peroxidic perfluoropolyethers having a very low ratio of end groups —COF to non-functional end groups, said ratio being generally lower than 5% and, more commonly, lower than 2%.

The number average molecular weight of the products obtained generally ranges from a few hundred to several hundred-thousand, for example, 500000. More usually, it ranges from 500 to 100000.

The amount of peroxidic oxygen in the products obtained generally ranges from 0.1 to 9 grams per 100 grams of product.

As is known, the obtained peroxidic perfluoropolyethers may be used as radical polymerization initiators and as crosslinking agents for polymers, in particular, for fluorinated polymers. By means of known methods, they can be converted into inert perfluoropolyethers (i.e., free of peroxide groups and reactive end groups) which are widely used as inert fluids for various applications; for example, for testing in the electronic sector, welding in the vapour phase and in the liquid phase. protection of building materials, lubrication, etc.

The peroxidic perfluoropolyethers obtained are also precursors of functional perfluoropolyethers which are useful, for example, as surfactants and intermediates for polymers.

After elimination of the peroxidic groups, the perfluoropolyethers obtained may be subjected to a cleavage process, for example, by means of heating in the presence of catalytic amounts of $AlBr_3$ or $AlF_3$, as described in U.S. Pat. No. 4,755,330. In this manner, products having a considerably lower average molecular weight than that of the starting materials may be obtained.

Molecules free of peroxidic oxygen may, of course, be present in the mixture of polymer molecules obtained through the process of the present invention.

The products obtained have the following formula:

$$A-O-(CF_2O)_{a1}(CF_2CF_2O)_{d1}(O)_{e1}-B \qquad (I)$$

wherein:
- $a1 = 0-5000$ and, more usually, $1-3000$
- $d1 = 0-5000$ and, more usually, $1-3000$
- $e1 = 1-3000$ and, more usually, $1-1500$
- $a1 + d1 = 1-5000$ and, more usually, $2-3000$
- $a1/d1 = 0.04-20$ and, more usually, $0.1-4$
- $e1/a1 + d1 = 0.001-0.9$ and more usually, $0.01-0.5$.

In the products formula (I) the values of the indexes refer to the individual molecules which are present in the mixtures of polymer molecules. In these mixtures, said indexes take average values which can be integers or intermediate values between zero and one or between an integer and the successive integer. The ratios between the indexes apply both to the individual molecules and to the mixtures of polymer molecules.

In formula (I) the units (O) are oxygen atoms of peroxidic nature and the perfluoroalkylenoxy units and the (O) units are statistically distributed within the chain.

The term "oxygen atom of peroxidic nature" denotes an oxygen atom bound to an oxygen of a unit $(CF_2-CF_2O)$ or $(CF_2O)$, thereby forming a peroxide group $-O-O-$.

The end groups A and B, the same or different from each other, represent the following radicals: $QCF_2$, $QCF_2-CF_2-$, CFO and $CF_2CFO$, wherein Q represents a fragment derived from the intitiator(s) and/or the solvent molecule. Generally, Q is F, Cl, or a perfluoroalkyl or perfluoroalkoxy group optionally containing one or more heteroatoms. When the initiator contains two O—F bonds, a fragment thereof can bind to two growing polymer molecules, thereby becoming incorporated in the molecular chain of the perfluoropolyether product.

Consequently, the nature of the end groups varies from product to product, depending on the nature of the intiator(s) (solvent) and on the process conditions.

Various parameters permit to influence the molecular weight and the structural composition of the products obtained. For instance, by increasing the concentration of the monomer in the liquid phase, an increase in the molecular weight may be obtained.

By reducing the ratio initiator(s)/tetrafluoroethylene, the product molecular weight can, usually, be increased. By increasing the ratio tetrafluoroethylene/initiator(s), the proportion of units $(CF_2-CF_2O)$ commonly increases.

The process according to the present invention can be conducted in the presence of ultraviolet radiation in conventional manner.

On the basis of the results described in example IIa of the previously mentioned U.S. Pat. No. 4,460,514, it could not be expected that, by reacting tetrafluoroethylene with oxygen in the liquid phase in the presence of $CF_3OF$, it would be possible to obtain, with high yields and with generally very reduced formation of by-products, peroxidic perfluoropolyethers containing $(CF_2-CF_2O)$ and $(CF_2O)$ units and having a very low ratio of end groups $-COF$ to non-functional end groups.

The main advantages of the present invention are:
Use is made of a chemical initiator instead of delicate and complex photochemical technologies;
The process is very flexible, allowing a wide range of products with different structural characteristics to be obtained by changing the process parameters (conditions).

The following examples merely serve to illustrate the invention and do not limit its scope in any way.

EXAMPLE 1

A 500 ml glass reactor equipped with stirrer, thermometer and pipes reaching the reactor bottom was employed. Into the reactor, maintained at $-75°$ C., 200 ml of dichlorodifluoromethane was condensed and, subsequently, a stream of 0.96 Nl/h of tetrafluoroethylene was fed by bubbling into the liquid solvent. After 5 minutes, maintaining the tetrafluoroethylene flow, a stream consisting of 0.33 Nl/h of $CF_3OF$, 0.017 Nl/h of $F_2$, 1 Nl/h of nitrogen and 5 Nl/h of oxygen was introduced. After 2 hours, the feeding of the reagents was stopped and the solvent and the reaction products having a boiling point of lower than 30° C. were distilled in an anhydrous nitrogen stream.

A total of 7.5 g of crude reaction product in the form of a colourless, transparent and viscous oil was obtained.

The crude product, examined by means of infrared spectroscopy, did not exhibit a band in the region of 5.25 μm attributable to $-COF$.

The crude product, subjected to iodometric analysis, exhibited an active oxygen content of 2.6 percent by weight.

The $^{19}F$-N.M.R. analysis revealed that the product consisted of perfluoropolyethers containing peroxide groups $-O-O-$ and represented by general formula:

$$A-O-(CF_2CF_2O)_d(CF_2O)_a(O)_e-B$$

wherein A and B represent end groups $-CF_3$ and $-CF_2CF_3$ and d/a equals 2.28. The number average molecular weight was 3050.

EXAMPLES 2 TO 15

By using the apparatus and the procedure described in example 1, a series of tests in solvents was carried out, varying temperature, initiator as well as oxygen and inert diluent ($N_2$) flow rates.

The results obtained are reported in table 1.

In example 3, the initiator was fed in the absence of nitrogen, in admixture with oxygen.

In examples 2 and 4, the initiator was fed in admixture with oxygen and nitrogen.

In examples 5 and 7 the stream of initiator, diluted with nitrogen, and the stream of oxygen were fed separately.

TABLE 1

| | Example No. | | | | | | | | | | | | | |
|---|---|---|---|---|---|---|---|---|---|---|---|---|---|---|
| | 2 | 3 | 4 | 5 | 6 | 7 | 8 | 9 | 10 | 11 | 12 | 13 | 14 | 15 |
| Reaction Conditions | | | | | | | | | | | | | | |

TABLE 1-continued

| | Example No. | | | | | | | | | | | | | | |
|---|---|---|---|---|---|---|---|---|---|---|---|---|---|---|---|
| | 2 | 3 | 4 | 5 | 6 | 7 | 8 | 9 | 10 | 11 | 12 | 13 | 14 | 15 |
| Temperature (°C.) | −75 | −100 | −85 | −74 | −75 | −74 | −72 | −68 | +20 | −72 | −72 | −71 | −70 | −72 |
| Starter flowrate (Nl/h): | | | | | | | | | | | | | | |
| : F | 0.05 | — | — | 0.35 | 0.05 | 0.2 | — | — | — | — | — | — | — | — |
| : $CF_3OF$ | 0.95 | 0.35 | 0.35 | — | 0.30 | — | 0.35 | 0.35 | 0.35 | 0.35 | 0.35 | 0.35 | 0.35 | 0.35 |
| Nitrogen (Nl/h) | 1 | 1 | 1 | 7 | 1 | 1 | 1 | 1 | 1 | 1 | 1 | 1 | 1 | — |
| Oxygen (Nl/h) | 2.5 | 5 | 5 | 5 | 5 | 3 | 5.5 | 5.5 | 5.5 | 5.5 | 2 | 11 | 22 | 5.5 |
| Tetrafluoroethylene (Nl/h) | 0.5 | 0.96 | 0.96 | 0.96 | 0.96 | 1.5 | 2.5 | 2.5 | 2.5 | 2.5 | 2.5 | 5 | 10 | 2.5 |
| Solvent (ml) | 200 (1) | 150 (1) | 150 (1) | 150 (1) | 150 (1) | 150 (1) | 150 (1) | 150 (2) | 50 (4) | 150 (3) | 150 (1) | 150 (1) | 150 (1) | 150 (1) |
| Time (hours) | 2 | 2 | 2 | 2 | 2 | 2 | 2 | 2 | 2 | 4 | 3 | 2 | 1.7 | 2 |
| Obtained polyperoxide perfluoropolyether products (g) | 1.8 | 7 | 8.3 | 5.7 | 7.5 | 10 | 20.5 | 18.5 | 3 | 42.5 | 28 | 42.5 | 66 | 21 |
| Characteristics of the obtained products | | | | | | | | | | | | | | |
| Number average molecular weight (NMR) | 800 | 1050 | 800 | 700 | 3050 | 1150 | 3000 | 2800 | 1050 | 18500 | 2500 | 4050 | 3650 | 3400 |
| Active oxygen content $\left(\dfrac{\text{g of active oxygen}}{100 \text{ g of product}}\right)$ | 3.86 | 2.47 | 3.04 | 2.75 | 2.6 | 1.37 | 3.02 | 5.3 | 1.49 | 4.25 | 1.83 | 6.02 | 8.0 | 4.14 |
| Average Structure: $AO-(C_2F_4O)_d(CF_2O)_a(O)_e-B$ $\dfrac{d}{a}$ | 0.05 | 0.28 | 2.01 | 0.08 | 2.28 | 0.19 | 2.9 | 3.8 | 0.06 | 4.51 | 1.63 | 10.92 | 25.22 | 4.26 |
| $\dfrac{\text{End groups COF}}{\text{End groups } C_nF_{2n+1}}$ (molar ratio) | 0.01 | 0.01 | 0 | 0.01 | 0 | 0.02 | 0 | 0 | 0 | 0 | 0 | 0 | 0 | 0 |

(1) F 12; (2) F 114; (3) F 115; (4) n-$C_7F_{16}$

EXAMPLE 16

Using the apparatus of example 1, maintained at −72° C., 150 ml of $CF_2Cl_2$ were condensed and then a stream of 2.5 Nl/h of $C_2F_4$ was fed by bubbling it into the liquid solvent. After 5 minutes, a stream consisting of 5.5 Nl/h of $O_2$, 0.4 Nl/h of $C_2F_5OF$ and 2 Nl/h of $N_2$ was introduced without interrupting the $C_2F_4$ flow. After 2 hours the feeding of the reagents was stopped and the solvent and the reaction products having a boiling point of lower than 30° C. were distilled in an anhydrous nitrogen stream. A total of 27 g of an oily product was obtained. According to $^{19}$F-N.M.R. analysis said product consisted of peroxidic polyether chains having the general formula:

A—O—$(CF_2O)_a(CF_2CF_2O)_d(O)_e$—B wherein A and B represent end groups —$CF_3$, $CF_2CF_3$ and —COF and d/a equals 0.19. The number average molecular weight was 1200 and the active oxygen content was 1.23%.

EXAMPLE 17

In a 250 ml glass reactor, equipped with stirrer, thermometer, cooler with a liquid at −78° C., connected with the atmosphere and gas inlet pipes reaching the reactor bottom, 150 ml of pentafluorochloroethane were condensed.

Subsequently, while maintaining an external cooling so as to keep the internal temperature at −72° C., streams of 2 Nl/h of tetrafluoroethylene, 5 Nl/h of oxygen and 0.1 Nl/h of bisfluoroxydifluoromethane, FO—$CF_2$—OF, diluted with 1 Nl/h of nitrogen, were separately fed by bubbling into the liquid phase.

The process was conducted for 2 hours.

At the end of the process, the solvent and the reaction products having a boiling point of lower than 30° C. were distilled and removed from the reactor in an anhydrous nitrogen stream.

A total of 15 g of crude reaction product in the form of a colourless, transparent and viscous oil was obtained.

The crude product was subjected to iodometric analysis and exhibited an active oxygen content of 1.6 percent by weight.

According to $^{19}$F-N.M.R. analysis, the product was composed of peroxidic polyether chains of general formula:

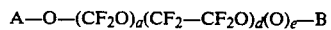
A—O—$(CF_2O)_a(CF_2$—$CF_2O)_d(O)_e$—B wherein A and B represent perfluoroalkyl end groups while —COF end groups were absent.

The d/a ratio was 0.64.

The number average molecular weight was equal to 2000.

EXAMPLE 18

A total of 150 ml of $CCl_2F_2$ was placed into a 200 ml reactor equipped with plunging polytetrafluoroethylene pipes for the gas feeding, thermometer well, magnetic stirrer, reflux cooler cooled to −70° C. and jacket for the circulation of the refrigerating liquid. After cooling to −50° C. the following streams were introduced for 3 hours:

| Oxygen | 3.0 Nl/h |
|---|---|
| $C_2F_4$ | 1.5 Nl/h |
| FCl/$N_2$ (½) | 1.2 Nl/h |

At the end of the process, the solvent was evaporated, leaving 11.2 g of a highly peroxidic perfluoropolyether oil which, when subjected to iodometric analysis, revealed an active oxygen content of 7.3 percent by weight.

EXAMPLE 19

A total of 140 ml of $CF_2Cl_2$ was placed into a 250 ml reactor equipped with plunging pipes for the gas feeding, thermometer well, magnetic stirrer and jacket for the circulation of the cooling liquid.

After cooling to $-60°$ C. the following streams were introduced for two hours:

|  |  |
|---|---|
| $C_2F_4$ | 1.5 Nl/h |
| Oxygen | 3.0 Nl/h |
| $ClF_3$ | 0.15 Nl/h |
| Nitrogen | 4 Nl/h |

At the end of the process, the solvent was evaporated, leaving 10 g of a highly peroxidic perfluoropolyether oil.

EXAMPLE 20

The reactor of example 19 was charged with 150 ml of $CF_2Cl_2$. After cooling to $-72°$ C. the following streams were introduced for one hour and forty five minutes:

|  |  |
|---|---|
| $C_2F_4$ | 1.5 Nl/h |
| $O_2$ | 4 Nl/h |
| $F_2$ | 0.1 Nl/h |
| $N_2$ | 3 Nl/h |

At the end of the process, the solvent was evaporated, leaving 7 g of a highly peroxidic perfluoropolyether oil.

We claim:

1. A process for preparing peroxidic perfluoropolyethers containing perfluoroalkylenoxy units of the formulae $(CF_2-CF_2O)$ and $(CF_2O)$, comprising: reacting tetrafluoroethylene with oxygen in a solvent at a temperature not exceeding 50° C. and in the presence of one or more compounds having one or more F—X bonds, in which X is selected from the group consisting of F, O and Cl, the compounds having one or more F—O bonds being selected from organic compounds containing one or more fluoroxy groups.

2. The process according to claim 1, wherein the compounds having one or more F—O bonds are perhalogenated alkyl or alkylene compounds, the halogen atoms of which are F atoms or F and Cl atoms, containing one or more fluoroxy groups and, optionally, one or more heteroatoms.

3. The process according to claim 2, wherein the heteroatom or heteroatoms are ether oxygen atoms.

4. The process according to claim 3, wherein the number of ether oxygen atoms ranges from 1 to 100.

5. The process according to claim 4, wherein the number of ether oxygen atoms ranges from 1 to 10.

6. The process according to claim 2 wherein the perhalogenated alkyl or alkylene compound containing one or more fluoroxy groups and optionally, one or more heteroatoms is a perfluorinated compound.

7. The process according to claim 2, wherein the perhalogenated alkyl or alkylene compound containing one or more fluoroxy groups and, optionally, one or more heteroatoms, is a compound containing halogen atoms which consist of F and Cl, in which the number of Cl atoms ranges from 1 to 10.

8. The process according to claim 1, wherein, when X is F, the compound having one or more F—X bonds if $F_2$.

9. The process according to claim 1, wherein, when X is Cl, the compound having one or more F—X bonds is a chlorine fluoride.

10. The process according to claim 1, wherein the compound or compounds having one or more F—X bonds are selected from the group consisting of:

1) $F_2$;
2) $R^5$—OF, wherein $R^5$ is a $C_{1-10}$-perhaloalkyl radical containing fluorine atoms or fluorine atoms and from 1 to 5 chlorine atoms;

$$R^6-O-(R^7O)_n(CF)_t-CF_2OF \atop | \atop D \qquad \qquad 3)$$

wherein:

D represents F or $CF_3$;

t is zero or 1;

$R^6$ is a $C_{1-3}$-perfluoroalkyl radical or a $C_{1-3}$-perhaloalkyl radical containing fluorine atoms and one or more chlorine atoms;

$R^7$ represents one or more perfluoroalkylene radicals, the same or different from one another, selected from $$-CF_2-,\ -CF_2-CF_2-\text{and}\ -CF_2-CF- \atop | \atop CF_3$$

and n ranges from 0 to 50;

$$\begin{array}{c} OF \\ | \\ R^8-C-R^9 \\ | \\ OF \end{array} \qquad 4)$$

wherein $R^8$ is F or a $C_{1-9}$-perhaloalkyl radical containing F atoms or F atoms and from one to three Cl atoms; $R^9$ is F, $R^8$ or a perfluoroalkylmonoether or perfluoroalkylpolyether group $R^6O-(R^7O)_n-CF_2-$, in which $R^6$, $R^7$ and n are as defined above;

5) FO—$(R^7O)_s$—F wherein $R^7$ is as defined above and s ranges from 1 to 100, provided that, when $R^7$ represents —$CF_2$—, s has a value higher than 1;

6) FO—$(CF_2)_v$—OF, wherein v ranges from 3 to 5.

11. The process according to claim 1, further comprising introducing into a liquid phase comprising a solvent, a gaseous stream of tetrafluoroethylene, a gaseous stream of oxygen and a gaseous of liquid stream of a compound or compounds having one or more F—X bonds.

12. The process according to claim 11 wherein the solvent is selected from the group consisting of linear and cyclic fluorocarbons, chlorofluorocarbons, perfluoroamines, perfluorinated ethers and mixtures thereof.

13. The process according to claim 11, wherein, when a gaseous or liquid stream of one or more compounds having one or more F—X bonds is fed into the liquid phase, the flow rate of said compound(s) ranges from 0.001 to 5 moles per hour per liter of liquid phase.

14. The process according to claim 13, wherein the flow rate of the compound(s) having one or more F—X bonds ranges from 0.01 to 2 moles per hour per liter of liquid phase.

15. The process according to claim 1, further comprising feeding into a liquid phase comprising a solvent and containing one or more compounds having one or more F—X bonds, a gaseous stream of tetrafluoroethylene and a gaseous stream of oxygen.

16. The process according to claim 15, wherein an inert gas is also fed into the liquid phase.

17. The process according to claim 16, wherein the inert gas is selected from the group consisting of nitrogen, argon, helium, $CF_4$, $C_2F_6$ and mixtures thereof.

18. The process according to claim 15, characterized in that, when the liquid phase already contains the compound(s) having one or more F—X bonds prior to the start of the reaction, the molar ratio $$\frac{\text{compound(s) having one or more F—X bonds}}{\text{tetrafluoroethylene}}$$

ranges from 0.01 to 0.1.

19. The process according to claim 1, wherein the temperature ranges from $-120°$ to $+50°$ C.

20. The process according to claim 19, wherein the temperature ranges from $-100°$ to $+20°$ C.

21. The process according to claim 20, wherein the temperature ranges from $-100°$ to $0°$ C.

22. The process according to claim 1 wherein the oxygen partial pressure in the reactor ranges from 0.01 to 10 atmospheres.

23. The process according to claim 22, wherein the oxygen partial pressure in the reactor ranges from 0.05 to 1 atmosphere.

24. The process according to claim 1, wherein the total pressure at which the reaction is conducted ranges from about 1 to about 10 atmospheres absolute.

25. The process according to claim 1, wherein the reaction is conducted in the presence of ultraviolet radiation.

* * * * *